March 11, 1958     J. A. KRAPF     2,826,178
HYDRAULIC CONTROL VALVE MECHANISM
Filed Sept. 19, 1951
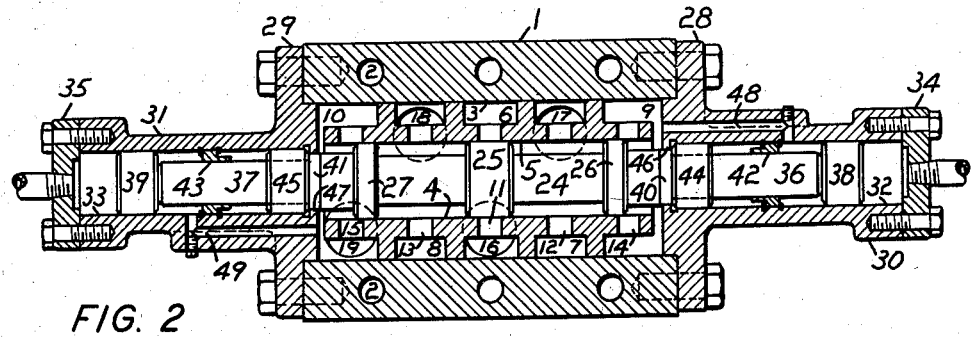
INVENTOR.
John Albert Krapf
BY Evans & McCoy
Attorneys

United States Patent Office 2,826,178
Patented Mar. 11, 1958

2,826,178

HYDRAULIC CONTROL VALVE MECHANISM

John Albert Krapf, Cleveland Heights, Ohio

Application September 19, 1951, Serial No. 247,340

1 Claim. (Cl. 121—46.5)

This invention relates to mechanism controlling the flow of hydraulic fluids under pressure to one or more of service conduits and more particularly to a valve mechanism for selectively controlling the direction of fluid delivery from a pressure supply conduit through service conduits to one or more hydraulic motors.

The present invention provides a directional control valve that is normally held in a neutral position by fluid pressure acting continuously upon two pistons which are operatively connected to the valve and which are relatively movable in such manner that one of them will return the valve to neutral position after movement of the valve in either direction from its neutral position, the valve being provided with means by which it may be actuated in either direction from its neutral position against the pressure acting on one of said pistons.

The control valve mechanism preferably includes a main control valve that is held in neutral position by fluid pressure continuously applied thereto and a pilot valve which is also held in neutral position by continuously applied fluid pressure, the main valve having fluid pressure motors for shifting it in either direction from neutral position and the pilot valve which controls the main valve shifting motors being actuated in opposition to the fluid pressure acting thereon by suitable means such as a manually operated lever.

Objects of the invention are to provide a control valve mechanism that is rugged and durable, that is of simple and inexpensive construction, that requires no special sealing means to prevent leakage and that is positive in action.

Reference should be had to the accompanying drawings forming a part of this specification in which:

Figure 1 is a diagrammatic view showing the control valve mechanism of the present invention employed to control the operation of a single hydraulic motor;

Fig. 2 is a horizontal, longitudinal section through the main control valve showing the movable parts in their neutral positions;

Fig. 3 is a vertical, longitudinal section through the main control valve, showing the relative positions of the pressure operated centering pistons when the valve is shifted in one direction from its neutral position;

Fig. 4 is a vertical longitudinal section through the pilot valve showing the movable parts in their neutral position; and Fig. 5 is a fragmentary section on an enlarged scale showing the relative positions of the pressure operated centering pistons of the pilot valve when the valve is shifted in one direction from its neutral position.

Referring to Figure 1 of the drawings, a main control valve A is shown connected to a hydraulic pressure supply conduit B and to a drain conduit C. The valve A is also connected to service conduits D and E either or both of which may be connected to one or more hydraulic motors, the valve A serving to connect either of the lines D or E to pressure or to drain and to connect one of the lines to drain while pressure is supplied to the other. As herein illustrated, the lines D and E are both connected to a single hydraulic motor in the form of a cylinder F that is pressure actuated in both directions. Cylinders having pistons actuated in one direction only by fluid pressure may also be controlled by the valve A since each service line is controlled independently of the other. The main control valve A is actuated by hydraulic motors and its operation is controlled by a pilot valve G that is operated by suitable means such as a lever H. The pilot valve G is connected to the pressure supply conduit B through a branch conduit b and to the drain conduit C by a branch conduit c. The pilot valve G controls the pressure in service lines d and e which, as herein illustrated, are connected to the actuating motors of a single control valve A, the line d leading to one of the actuating motors of the valve A, and the line e leading to the other actuating motor of the valve A. Actuation of the valve G in one direction or the other from its neutral position supplies one of the service conduits d or e with pressure and connects the other service conduit to drain. The pilot valve G is preferably pressure centered in a neutral position where both the conduits e and d are connected to drain to permit the main control valve A to be automatically returned to its neutral position upon release of the lever H. The valves A and G are both three position pressure centered valves preferably of the piston type.

The valve A has a body 1 which may be provided with openings 2 to receive bolts (not shown) for securing it to a suitable support. The body 1 has a longitudinal bore 3 in which a valve receiving member 4 fits, the valve receiving member 4 having a cylindrical bore 5 which provides a valve chamber and external circumferential recesses which provide a central annular chamber 6, annular chambers 7 and 8 on opposite sides of the chamber 6, and chambers 9 and 10 outwardly of the chambers 7 and 8. The member 4 has ports 11, 12, 13, 14 and 15 connecting the chambers 6, 7, 8, 9 and 10 to the valve chamber.

A port 16 in the valve body 1 places the chamber 6 in communication with the pressure supply conduit B. Ports 17 and 18 in the valve body 1 place the chambers 7 and 8 in communication with the service conduits D and E. A port 19 in the body 1 provides communication between the chamber 10 and the drain conduit C. The chamber 9 communicates with the chamber 10 so that both the chambers 9 and 10 are always connected to the drain conduit C through ports 20 and 21 in the top of the body 1 opening to the chambers 9 and 10, a cap plate 22 on the top of the valve body having a recess 23 that communicates with the ports 20 and 21 and that provides a passage between the ports 20 and 21.

A piston valve 24 is slidably mounted in the valve chamber 5 and is provided with a central piston portion 25 and piston portions 26 and 27 which are spaced axially from the piston portion 25 on opposite sides thereof. When the piston valve 24 is in its central or neutral position the ports 11 are closed by the central piston portion 25. In this position of the valve the piston portion 26 is disposed between the ports 12 and 14 and the piston portion 27 is disposed between the ports 13 and 15, delivery ports 17 and 18 being cut off from the pressure chamber 6 by the piston portion 25 and from the drain chambers 9 and 10 by the piston portions 26 and 27.

As shown in Fig. 3, when the valve 24 is shifted to the left from the position shown in Fig. 2, the pressure chamber 6 is placed in communication with the port 17 through ports 11 and 12 and liquid under pressure from conduit B is delivered to the service conduit D and at the same time the port 18 is connected with the drain conduit C through the ports 13 and 15 to drain liquid from the conduit E. Movement of the valve 24 in the opposite direction from its neutral position connects the conduit E to pressure and the conduit D to drain, the pressure connection to the conduit E being through the ports 11, 13 and 18 and the connection of the conduit D to drain being through the ports 17, 12, 14, the chamber 9 and the passage 23 to the chamber 10 which is connected to the drain C.

End closure members 28 and 29 are attached to opposite ends of the body 1 and these closure members have tubular extensions 30 and 31. The extensions 30 and 31 have cylindrical bores 32 and 33 that are axially alined with the valve chamber 5 and the outer ends of the bores 32 and 33 are closed by removable caps 34 and 35 to which the conduits d and e are attached. The bores 32 and 33 provide cylinders for valve actuating rams 36 and 37 which have piston heads 38 and 39 at their outer ends which slidably fit in the cylinders 32 and 33 and move with the rams, the heads 38 and 39 being preferably formed separately for convenience of assembly. The cylinders 32 and 33 are preferably of the same diameter and the two rams 36 and 37 are preferably identical. The inner ends of the rams 36 and 37 engage with opposite ends of the piston valve 24 and the valve engaging inner end portions 40 and 41 of the rams 36 and 37 are slightly enlarged.

The tubular extensions 30 and 31 have fixed partition rings 42 and 43 mounted in the cylinders 32 and 33 intermediate the ends thereof and inwardly of the piston heads 38 and 39. The rams 36 and 37 slidably fit in the partition rings 42 and 43 and inwardly of the partition rings 42 and 43, valve centering sleeve pistons 44 and 45 slidably fit on the rams 36 and 37 and within the bores 32 and 33 which provide cylinders for the valve centering sleeve pistons 44 and 45 inwardly of the partitions 42 and 43. The sleeve pistons 44 and 45 are slidable between the partitions 42 and 43 and stop shoulders 46 and 47 at the inner ends of the cylinders 32 and 33. Passages 48 and 49 in the closure members 28 and 29 connect the drain chambers 9 and 10 to the portions of the cylinders 32 and 33 between the partitions 42 and 43 and the piston heads 38 and 39 so that liquid is not trapped therein. Passages 50 and 51 in the closure members 28 and 29 and the valve body 1 connect the pressure chamber 6 of the valve with the cylinders 32 and 33 between the partitions 42 and 43 and the sleeve pistons 44 and 45 so that, in all positions of the piston valve 24 the sleeve pistons 44 and 45 are subjected to line pressure urging them toward the valve 24.

In the neutral position of the valve 24 the sleeve pistons 44 and 45 are engaged with the stop shoulders 46 and 47 and with the enlarged ends 40 and 41 of the rams 36 and 37. Movement of the valve 24 in either direction from its neutral position moves one of the sleeve pistons 44 or 45 outwardly away from its stop shoulder against the line pressure acting upon the displaced sleeve piston. Pressure acting upon the displaced sleeve piston 44 or 45 serves to move the displaced piston back against its stop shoulder and to return the piston valve 24 to its neutral position whenever the axial thrust on the valve 24, which has moved it out of its neutral position, is released.

Axial thrust is exerted on the valve 24 to shift the same out of its neutral position by either of the rams 36 or 37 when the ram is moved inwardly by fluid pressure applied to its piston head, each ram being freely movable in an inward direction through its sleeve piston to shift the valve 24, the sleeve piston being held in its innermost position by the pressure exerted upon its outer end face during return of the valve to neutral position. Axial thrust is exerted on the piston heads 38 and 39 by fluid pressure introduced into the outer ends of the cylinders 32 or 33 through the conduits d and e, the pilot valve G serving to deliver pressure to either of the conduits d or e and to simultaneously connect the other of said conduits to the drain conduit c.

Movement of the valve 24 is opposed by the pressure acting upon the piston 44 or 45 toward which the valve is moved, the force created by the pressure exerted on the ram piston 38 or 39 being greater than the resisting force created by the pressure exerted on the opposed sleeve piston because of the greater effective area of the ram piston.

The valve G is preferably a pressure centered valve that is movable in either direction from a neutral position, the lever H as herein shown being vertical when the valve G is in neutral position and being movable in either direction from its vertical position. In the neutral position of the valve G both conduits d and e are connected to drain and the piston valve 24 is held in its neutral position by the fluid pressure acting upon the sleeve valves 44 and 45. Whenever the lever H is released fluid pressure acting upon the valve G returns the valve to neutral position, causing the outer ends of both of the cylinders 32 and 33 to be connected to drain so that the valve A is also restored by fluid pressure to its neutral position. In the neutral position of the piston valve 24 flow through both the service conduits E and D is cut off and both conduits E and D are cut off from the drain by the piston portions 26 and 27 of the valve 24 so that the piston of the cylinder F is locked against movement. This insures stopping of the hydraulically operated mechanism controlled by the valve A whenever the lever H is released, it being necessary to positively hold the lever H at one side or the other of its neutral position to continue delivery of pressure fluid through the valve A. Any leakage past either the piston valve 24 or from the valve actuating pressure chambers is to the drain conduit C and, since all movable parts are entirely within the valve casing, no special packing is required and the movable parts may be subjected to wear for long periods of time without materially affecting the efficiency of operation.

As shown in Fig. 4, the pilot valve G has a body 52 which has a longitudinal bore 53 that provides a cylindrical valve chamber. The valve chamber 53 has a circumferential recess 54 disposed centrally with respect to two circumferential recesses 55 and 56 that are spaced axially from the recess 54 on opposite sides thereof. A piston valve 57 is slidably mounted in the chamber 53 and is provided with spaced piston portions 58 and 59. A port 60 connects the central recessed portion 54 of the valve chamber to the pressure conduit b and ports 61 and 62 connect the recessed portions 55 and 56 with the service conduits e and d that lead to the main valve actuating motors. Spaced outwardly from the recess 55 there is a fourth recess 63 which is connected by a port 64 to the drain conduit c.

A longitudinal passage 65 in the valve body 52 connects the opposite end portions of the valve chamber 53 so that portions of the chamber 53 outwardly of the piston portions 58 and 59 of the valve 57 are at all times connected to drain. Closure members 66 and 67 are attached to opposite ends of the valve body 52 and extensions 68 and 69 of the valve extend through and slidably fit in openings in the closure members 66 and 67. A casing extension 70 is attached to the closure member 66 and the extension 70 has a bore 71 that forms a cylinder therein coaxial with the valve chamber 53. A closure member 72 is attached to the outer end of the extension 70 and is provided with a plug portion 73 that fits in the bore 71. The plug portion 73 has an axial bore 74 and a counterbore 75 at its inner end.

The extension 68 of the piston valve 57 extends into the cylinder 71 and has an enlarged head 76 at its outer end which is of slightly less diameter than the counterbore 75 and which moves into the counterbore 75 as the valve 57 is moved toward the right, as shown in Fig. 3. Within the cylinder 71 inwardly of the head 76 and inwardly of the plug portion 73 of the end closure member 72 there is a sleeve piston 77 which has a sliding fit within the cylinder 71 and on the extension 68 of the piston valve. Beyond the outer end of the extension 68 there is a valve actuating ram 78 which has a sliding fit in the bore 74 and which has an enlarged head 79 that bears against the head 76. The head 79 is also of a diameter less than the internal diameter of the counterbore 75 and moves with the head 76 in the counterbore 75.

The pressure chamber 54 communicates with a longitudinal passage 80 in the valve casing and the passage 80 is connected by ports 81 and 82 to the cylinder 71 inwardly of the sleeve piston 77 and to the cylinder 74 outwardly of the ram 78. A port 83 connects the passage 65 with the counterbore 75 through a slot 84 in the inner end of the plug 73 so that the counterbore is at all times connected to drain.

In the neutral position of the valve 57 the sleeve piston 77 is held against the inner end of the plug 73 by fluid pressure exerted upon the inner end face of the piston 77. The piston 77 also engages the head 76 of the valve extension 68 to hold the valve 57 in its neutral position. The ram 78 is held against the head 76 by the fluid pressure acting upon the end face of the piston portion of the ram in the cylinder 74. The area of the inner end face of the sleeve piston 77 is greater than the area of the end face of the ram piston in the cylinder 74, so that the valve 57 is normally held by the fluid pressure continuously exerted on the pistons 77 and 78 in its neutral position. If the upper end of the lever H is swung to the left from the position shown in Fig. 4, the extension 68 of the valve is moved through the sleeve piston 77 and forces the ram 78 outwardly. Upon release of the lever H pressure acting on the ram 78 returns the valve to its neutral position where the head 76 engages with the sleeve piston 77. If the upper end of the valve H is moved to the right from the position shown in Fig. 4, the sleeve valve 77 is pulled inwardly against the pressure in the cylinder 71 and the ram 78 is caused to follow the head 76 by the pressure exerted thereon in the cylinder 74. Upon release of the lever H the force created by the pressure exerted on the sleeve piston 77 overbalances the force created by the pressure exerted on the smaller surface area of the ram piston 78, causing the sleeve valve to move back into engagement with the plug 73 and the valve 57 to be returned to its neutral position. Since in the neutral position of the valve 57 the conduits e and d are both connected to drain, the valve 24 will always be returned to its neutral position. Movement of the valve 57 in either direction from its neutral position controls the delivery of pressure fluid through it to the actuating motor at one end or the other of the valve A to impart a corresponding shift to the piston valve 24.

The movement of the valve 57 in either direction is opposed by line pressure acting on either the piston 77 or the piston 78, depending on the direction of movement, and the force required on the lever H to move the valve is always proportional to line pressure. This enables the operator to feel the line pressure and any substantial variation from normal line pressure will be immediately apparent to him when he actuates the lever H.

The valves A and G are each retained in neutral position by opposing pistons to which fluid pressure is continuously applied and each is movable against the thrust exerted by one of the pistons. The valve G may be employed to control motors other than main control valve motors when desired and the valve A may be actuated by means other than hydraulic motors if desired.

It is to be understood that in accordance with the provisions of the patent statutes, variations and modifications of the specific devices herein shown and described may be made without departing from the spirit of the invention.

What I claim is:

A hydraulic control valve mechanism for selectively connecting a hydraulic pressure supply conduit to either of two service conduits and simultaneously connecting the other of the service conduits to a drain conduit comprising a valve casing having a valve chamber through which liquid is delivered from said supply conduit to said service conduits and from said service conduits to said drain conduit and an attached closure member at each end of said valve chamber, a piston valve slidable axially in said valve chamber in either direction from a neutral position where flow through said valve casing to and from both service conduits is cut off to connect either of said service conduits to said pressure supply conduit and the other to the drain conduit, means maintaining communication at all times between opposite ends of said valve chamber and said drain conduit, a valve centering cylinder in each of said closure members that is axially alined with said valve, a valve shifting piston in each of said cylinders, means maintaining communication at all times between the outer ends of said centering cylinders and said pressure conduit to urge said pistons in directions to apply opposing axial thrusts to said valve, stop means limiting the movements of said pistons in their thrust applying directions and positioned to normally hold the piston valve in its neutral position, an actuating cylinder in each of said closure members that is axially alined with the valve, valve shifting pistons in said actuating cylinders for exerting axial thrusts on said valve in opposite directions, the pressure receiving faces of each of said actuating pistons being of greater area than the pressure receiving face of the opposing centering piston, and means for connecting the outer end of either of said actuating cylinders to the fluid pressure supply conduit and the outer end of the other of the actuating cylinders to the drain conduit to move the valve in either direction from its neutral position in opposition to the pressure in one of said centering cylinders.

References Cited in the file of this patent

UNITED STATES PATENTS

| | | |
|---|---|---|
| 1,251,563 | O'Donnell | Jan. 5, 1918 |
| 1,897,386 | Ferris | Feb. 14, 1933 |
| 2,157,240 | Keel | May 9, 1939 |
| 2,234,009 | Robinson | Mar. 4, 1941 |
| 2,365,075 | Hassman | Dec. 12, 1944 |
| 2,369,505 | Ward | Feb. 13, 1945 |
| 2,370,137 | Biggert | Feb. 27, 1945 |
| 2,388,662 | Anderson | Nov. 13, 1945 |
| 2,582,088 | Walthers | Jan. 8, 1952 |
| 2,608,263 | Garrison | Aug. 26, 1952 |
| 2,614,539 | Ernst | Oct. 21, 1952 |

FOREIGN PATENTS

| | | |
|---|---|---|
| 495,283 | Great Britain | Nov. 10, 1938 |
| 598,884 | Great Britain | June 15, 1946 |